United States Patent [19]

Kondo et al.

[11] 4,306,124
[45] Dec. 15, 1981

[54] POSITION MEMORY DEVICE

[75] Inventors: Yoshinobu Kondo, Kosai; Hideyuki Nagashima, Yokohama, both of Japan

[73] Assignee: Nissan Motor Co., Ltd., Yokohama, Japan

[21] Appl. No.: 82,409

[22] Filed: Oct. 5, 1979

[30] Foreign Application Priority Data

Oct. 9, 1978 [JP] Japan .................. 53-138769[U]

[51] Int. Cl.³ .............................................. H01H 3/02
[52] U.S. Cl. ............................... 200/17 R; 74/568 M; 200/52 A; 318/467
[58] Field of Search ............... 200/52 R, 52 A, 38 D, 200/6 R, 6 A, 6 B, 17 R; 318/466, 467, 568; 74/568 M, 567, 568 R, 568 T, 568 FS, 569

[56] References Cited

U.S. PATENT DOCUMENTS 916,898 3/1909 Stull .................... 200/17 R
2,953,667 9/1960 Kavanaugh ............... 74/569
3,597,554 8/1971 Siegal ..................... 318/466

Primary Examiner—J. V. Truhe
Assistant Examiner—Morris Ginsburg
Attorney, Agent, or Firm—Silverman, Cass & Singer, Ltd.

[57] ABSTRACT

A position memory device for a reclining seat to memorize tilted positions of a seat back. The memory device includes a memory wheel adapted to be rotated with movements of the seat back, a reset cam integrally formed with the memory wheel, and a reset lever urging against the reset cam so as to rotate the memory wheel relative to the seat back. Two memory switches adapted to engage respective ends of a recessed portion of the memory wheel to sense when the memory wheel is rotated to a determined position with the seat back in the memorized position, thereby improving the accuracy of returned positions of the seat back and decreasing operative forces of the reset lever.

5 Claims, 7 Drawing Figures

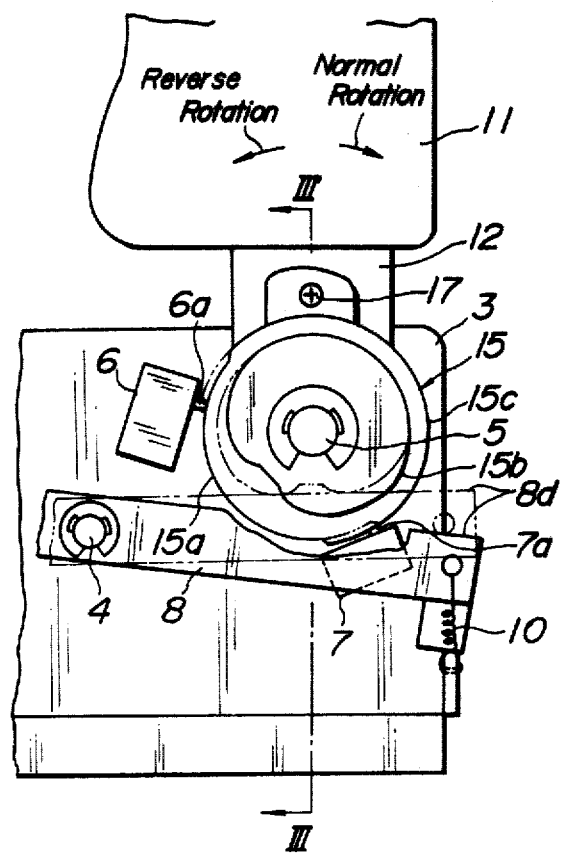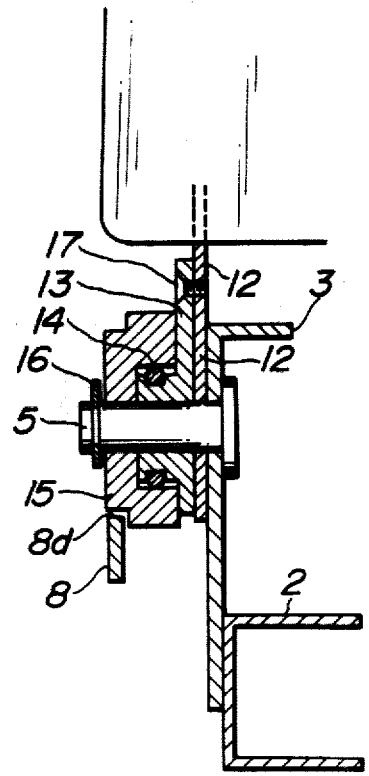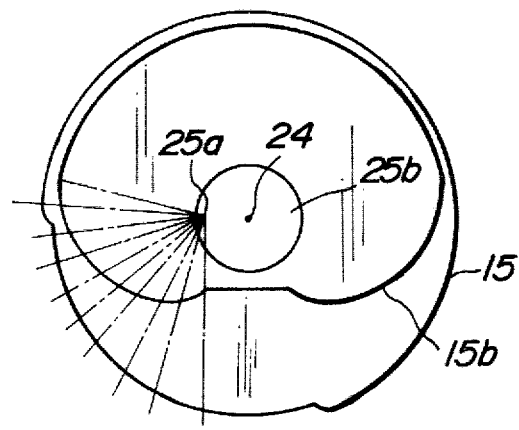

POSITION MEMORY DEVICE

BACKGROUND OF THE INVENTION

1. Field of the Invention

The present invention relates to a position memory device for use in a driving mechanism, the driving mechanism for use in a reclining device and the like driven by an electric motor.

2. Description of the Prior Art

Recently, electric motor driven reclining devices have been widely used for automobiles. Among these electric motor driven devices, some include so-called memory mechanisms which, once a tilted position of a seat back has been memorized, are capable of restoring the tilted position even after the seat back is further tilted forwardly or backwardly. There are often differences between the memorized position and restored position to which the seat back is returned with the aid of the memory mechanism, which sometimes become noticeable to the extent such that human bodies sense the differences. Accordingly, the occupants are frequently obliged to endure the uncomfortable positions of the seat back or adjust finely the seat back positions to the memorized positions. In addition, the reset levers generally require large operative forces for memorizing the tilted positions of the seat backs which make operation of the reset levers difficult for women and children.

SUMMARY OF THE INVENTION

It is an object of the invention to provide an improved position memory device which overcomes all the disadvantages of the prior art above described.

It is further object of the invention to provide a position memory device for a power reclining device, which is improved in accuracy of returned positions and requires a less operative force on a reset lever.

The position memory device includes a memory wheel rotated with movements of a member whose position is to be memorized. Two memory switches turn on and off upon engagements thereof with a recessed portion of said memory wheel. A reset cam is integrally formed with said memory wheel and a reset lever is urged against said reset cam to rotate said memory wheel and cause said memory switch to abut against said recessed portion of said memory wheel. The two memory switches respectively engage ends of said recessed portion of said memory wheel when said memory wheel is rotated by means of said reset lever.

In order that the invention may be more clearly understood, preferred embodiments will be described, by way of example, with reference to the accompanying drawings.

BRIEF DESCRIPTION OF THE DRAWINGS

FIG. 1b is an explanatory view of a switch used for the device shown in FIG. 1a;

FIG. 2 is a side view of the device according to the invention with a portion of a reset lever broken away;

FIG. 3 is a sectional view taken along line III—III in FIG. 2;

FIG. 4 is an explanatory view of a memory wheel and a reset cam used in the device according to the invention;

DETAILED DESCRIPTION OF THE PREFERRED EMBODIMENT

Figure 1A:
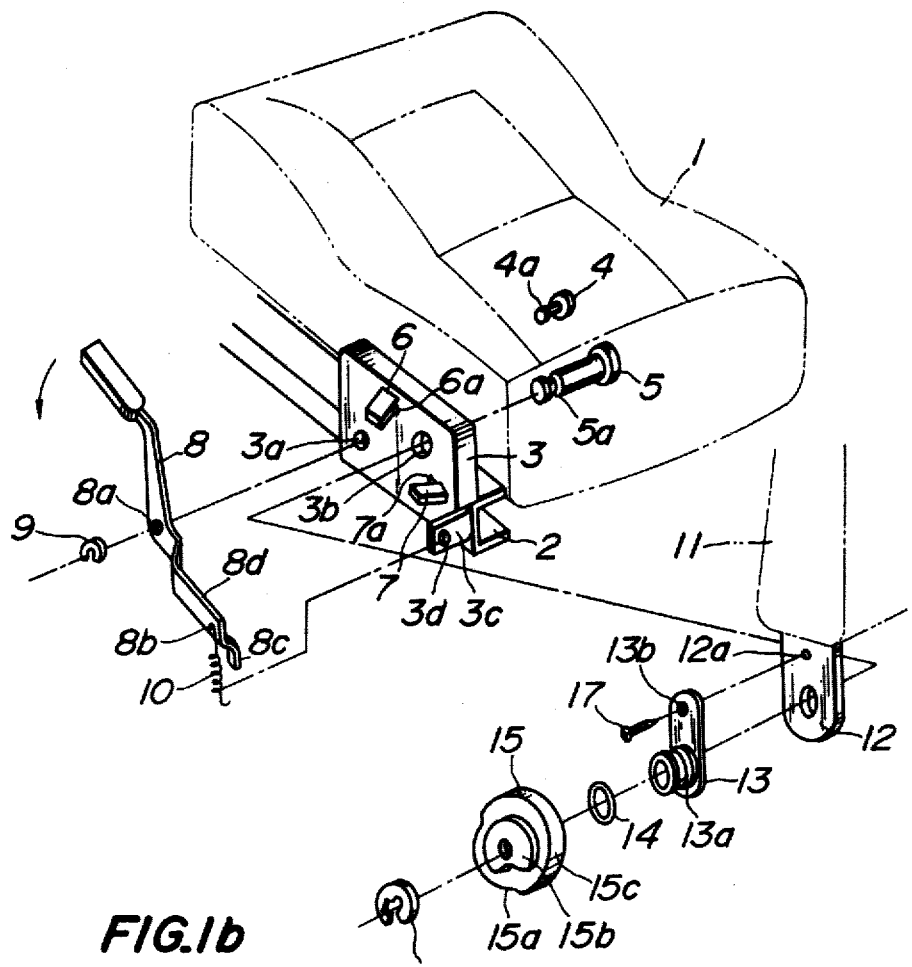
FIG. 1a is an exploded perspective view illustrating the outline of one embodiment of the invention.

Referring to FIG. 1 illustrating one embodiment of the invention, a squab or cushion 1 of a seat is adapted to slide on upper rails 2 fixed to an underside of the cushion 1. To one of the upper rails 2 is fixed a bracket 3 formed with apertures 3a and 3b through which shafts 4 and 5 pass and extend outwardly therefrom. The shaft 4 is inserted in an aperture 8a of a reset lever 8 and includes an encircling groove 4a for fitting therein a cir-clip or snap ring 9 for preventing the shaft 4 from exiting from the aperture 8a of the reset lever 8. In this manner, the reset lever 8 is rotatably journaled by the shaft 4 on the bracket 3. A spring 10 extends between an end hole 8b of the reset lever 8 and a hole 3d formed in a lug 3c of the bracket 3 to urge the reset lever 8 in a manner such that a lower end of a stopper portion 8c of the reset lever 8 abuts against the upper end of the lug 3c of the bracket 3. Onto the shaft 5 are rotatably fitted a frame 12 of a seat back 11 as a member of the seat and an arm wheel 13. The arm wheel is formed with a groove 13a in which is fitted an elastic ring 14 made for example of a rubber. A memory wheel 15 is integrally journaled on the elastic ring 14 and on the arm wheel 13 in a manner which is rotatable relative to the arm wheel, but against the frictional force on the elastic ring 14. The shaft 5 is prevented from exiting therefrom by means of a cir-clip 16 fitted in a groove 5a formed in the shaft 5. A set screw 17 passes through an aperture 13b of the arm wheel 13 and is threadedly engaged in an internally threaded aperture 12a of the frame 12. As shown in FIGS. 1a and 2, switches 6 and 7 are fixed to the bracket 3 by means of suitable fastening means at locations where the switches 6 and 7 are turned on and off when they engage any one of the ends of a recessed or reduced diameter portion 15a provided on the circumference of the memory wheel 15. On the memory wheel 15 is provided a reset cam 15b which engages a lifting face 8d of the reset lever 8.

Figure 1B:
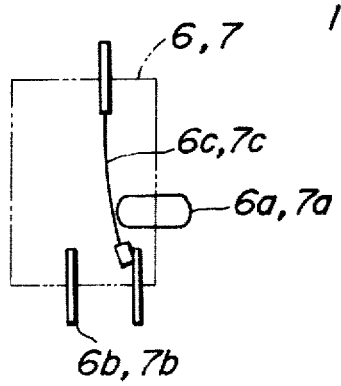

Referring to FIG. 1b, the switch 6 or 7 comprises a button 6a or 7a and contact 6b or 7b. A movable arm 6c or 7c is adapted to be engaged with the contact as a result of the button being pushed and has a weak operative force.

The operation of the memory device according to the invention will be explained hereinafter referring to FIGS. 2 and 3.

Tilting of the seat back 11 forwardly and backwardly is achieved by a conventional electric motor type tilting device and will not be described.

First, a memory operation of the seat back 11 which tilts forwardly and backwardly by means of a known tilting device will be explained.

When the reset lever 8 is rotated about the shaft 4 in a reset direction as shown by the arrow in FIG. 1, the lifting face 8d of the reset lever 8 urged against the circumferential surface of the reset cam 15b to cause the memory wheel 15 to rotate about the arm wheel 13 until the reset cam 15b of the memory wheel 15 is brought into a two point contact position or determined position with the lifting face 8d of the reset lever 8, as shown in phantom lines in FIG. 2. This rotation of the memory wheel 15 causes the ends of the recessed or reduced diameter portion 15a of the memory wheel 15 to contact the switch buttons 6a and 7a of the switches 6 and 7 fixed to the bracket 3, thereby turning off the switches 6 and 7. The tilted position of the seat back 11 is thus freshly stored or memorized by the operation of the switches.

Figure 5:
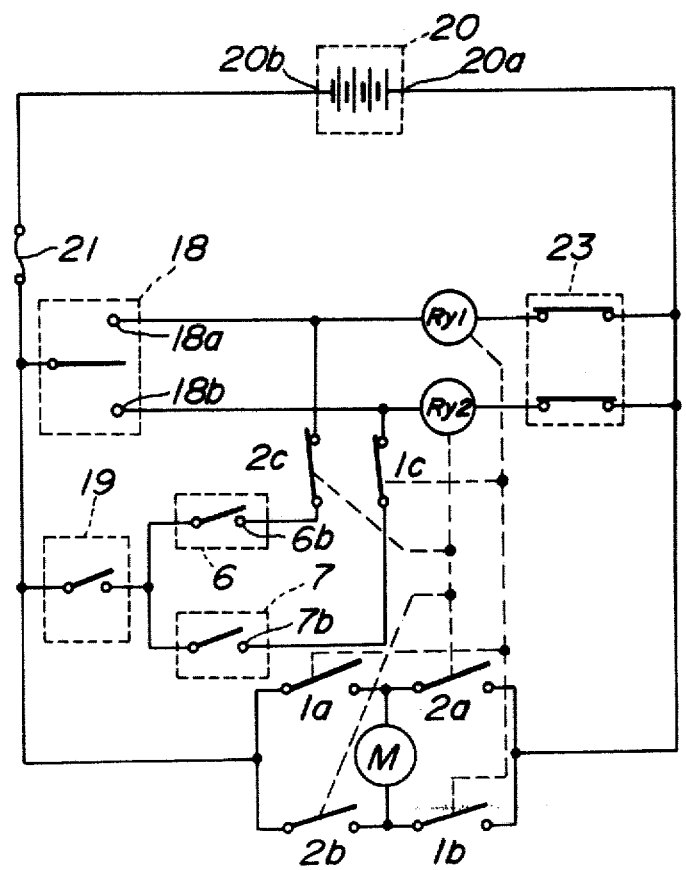
FIG. 5 is an electric circuit for operating the device according to the invention.

FIG. 5 illustrates a circuit for operating the device according to the invention, wherein the circuit comprises an automatic return type manual tilting operation switch 18 with a backward tilting contact 18a and a forward tilting contact 18b. When the backward tilting contact 18a is closed, a motor M is rotated in a normal direction to tilt the seat back backwardly, and when the forward tilting contact 18b is closed, the motor M is rotated in a reverse direction to tilt the seat back forwardly. The circuit further comprises a backward tilting relay Ry$_1$ for the seat back 11 with normally opened contacts 1a and 1b and a normally closed contact 1c, shown connected by dashed lines, and a forward tilting relay Ry$_2$ for the seat back 11 with normally opened contacts 2a and 2b and a normally closed contact 2c, also shown connected by dashed lines. The relay contacts 2c and 1c form a protective circuit for preventing the switches 18 and 19 from being simultaneously actuated to operate the motor in normal and reverse directions. This circuit includes a power source 20 having a plus terminal 20a and a minus terminal 20b. A limiter switch 23 is built in the above known tilting device for limiting the range of the forward and backward tilting of the seat back 11.

The operation for restoring the seat back 11 to the memorized position after it has been tilted forwardly or backwardly from the memorized position will be explained referring to the circuit in FIG. 5 and FIG. 2.

In order to tilt the seat back backwardly, the manual tilting operation switch is changed over to close the contact 18a. As the result, the backward tilting relay Ry$_1$ is energized to close the relay contacts 1a and 1b, so that a current flows from the plus terminal 20a of the power source 20 through the contact 1b, the motor M, the contact 1a and a fuse 21 to the minus terminal 20b, thereby energizing the motor M in the normal direction to tilt the seat back backwardly in a clockwise direction as viewed in FIG. 2. At this time, the memory wheel 15 is rotated together with the arm wheel 13 and frame 12 of the seat back 11 from the position shown in phantom lines in FIG. 2, so that the button 7a of the switch 7 goes out of the reduced diameter portion 15a of the memory wheel 15 to abut against a circumferential surface 15c. Upon the disengagement of the button 7a of the switch 7 from the recessed or reduced diameter portion 15a a contact 7b of the switch 7 shown in FIG. 5 is closed to complete the circuit including the switch 7.

In order to return the seat back 11 from the backwardly inclined position to the memorized position, the automatic tilting operation switch 19 is actuated to operate the forward tilting relay Ry$_2$ causing the relay contacts 2a and 2b to be closed, so that an electric current flows from the plus terminal 20a of the power source 20 through the contact 2a, the motor M, the contact 2b and the fuse 21 to the minus terminal 20b of the power source 20 to drive the motor M in the reverse direction permitting the seat back 11 to tilt forwardly. In this manner as soon as the switch button 7a contacts the reduced diameter portion 15a of the memory wheel 15, the switch 7 takes an off state to stop the forward tilting motion of the seat back 11 and to return it to the memorized position. A returning motion of the seat back from a forwardly tilted position to the memorized position can also be achieved in the same manner with the aid of the switch 6 actuated by the memory wheel 15.

Referring to FIG. 4 illustrating the configuration of the circumference of the reset cam 15b in detail, a center of rotation 24 of the memory wheel 15 is offset from centers 25a and 25b of curvatures of circumferential faces of the cam 15b. These two curvatures or protrusions have increasing radii away from the center of rotation 24 and form stop means where they tangentially meet lifting face 8d of reset lever 8. When the reset lever 8 is urged against the circumferential faces of the cam 15b, the circumferential faces rotate together with the memory wheel 15 about the rotating center 24 according to a principle of leverage. Accordingly, the urging force of the reset lever 8 is relatively slight.

According to the invention as above described, the two memory switches are used and any one of them normally engages any one of the ends of the reduced diameter portion of the memory wheel. The memory switches actuated by the rotation of the memory wheel precisely store or memorize the position of the seat back which is returned back to the memorized position with less error, thereby eliminating a requirement of a fine adjustment of the returned position of the seat back.

According to the invention, furthermore, switches having weak operative forces to engage the memory wheel are used to achieve a reduction of the operative force of the reset lever.

Figure 6:
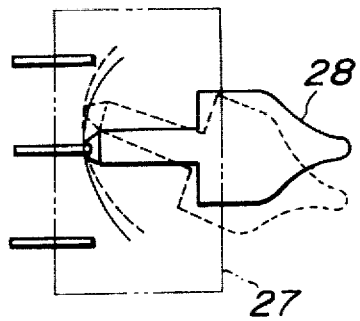
FIG. 6 is an explanatory view of a memory switch of a prior art.

In an electric circuit of a tilting device of the prior art, an electric current required to operate a motor of the device is caused to flow through a memory switch 27 shown in FIG. 6. The current is so large as to require increased contacting forces of the memory switch 27, operative forces of a switch hinge 28 and frictional forces of a memory wheel 15 and reset cam 15b on an elastic ring 14 with resulting required great operative forces of a reset lever 8.

In contrast herewith, according to the invention the electric current required to operate the motor flows through the contacts 1a, 1b and 2a, 2b of the relays Ry$_1$ and Ry$_2$, so that the memory switches 6 and 7 need only be switches for ascertaining the memorized position of the seat back. Hence, they may have weak operative forces to reduce the contacting forces of the switches and frictional forces of the memory wheel 15 and arm wheel on the elastic ring 14 and therefore to reduce the operative force of the reset lever 8, thereby facilitating the operation of the reset lever.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A position memory device for a member whose position is to be memorized, comprising:
    driving means for rotatively driving said member;
    a memory wheel connected to said member, the memory wheel normally being rotatable with said member and being rotatable relative to said member, the memory wheel including a reset cam integrally fixed thereto, the reset cam having a cam surface with stopper means and the cam surface having increasing radii away from the stopper means;

a reset lever adjacent the reset cam, the reset lever being operative when said member's position is to be memorized and when operated the reset lever being urged against the reset cam cam surface to rotate the reset cam, and thereby the memory wheel, relative to the member to a determined position determined by the engagement of the reset lever and the stopper means, the rotational position of the memory wheel, while in the determined position, relative to the member representing the memorized position of the member; and sensor means for sensing the rotational position of the memory wheel and thereby the memorized position of the member to deenergize and energize the driving means and return said member to said memorized position when said member is at a position other than said memorized position.

2. The position memory device as claimed in claim 1, wherein said sensor means comprise two sensors which are both OFF when said reset cam is at said determined position and any one of which is ON when said reset cam is at a position other than said determined position.

3. The position memory device as claimed in claim 1, wherein said memory wheel is formed with a recessed portion and said sensor means comprise two sensors which in conjunction with said recessed portion are both OFF when said stopper means are at a position in contact with said reset lever and any one of which is ON when said stopper means are at another position.

4. The position memory device as set forth in claim 1, wherein said stopper means of said cam surface includes two protrusions which are in two point contact with said reset lever when said reset cam is at said determined position.

5. The position memory device as set forth in claim 1, wherein said memory wheel is journaled on an elastic ring on an arm wheel fixed to said member, thereby frictionally affixing said memory wheel to said member.

* * * * *